United States Patent [19]

Yasui

[11] Patent Number: 5,181,336
[45] Date of Patent: Jan. 26, 1993

[54] FIXED GUIDE MOUNTING STRUCTURE

[75] Inventor: Toshihiko Yasui, Tondabayashi, Japan

[73] Assignee: Shimano, Inc., Osaka, Japan

[21] Appl. No.: 797,064

[22] Filed: Nov. 25, 1991

[30] Foreign Application Priority Data

Nov. 29, 1990 [JP] Japan ............................ 2-127991[U]

[51] Int. Cl.⁵ .......................................... A01K 87/04
[52] U.S. Cl. ......................................... 43/24
[58] Field of Search ............................ 43/24

[56] References Cited

U.S. PATENT DOCUMENTS

| | | | |
|---|---|---|---|
| 1,450,700 | 4/1923 | Mull | 43/24 |
| 2,038,175 | 4/1936 | Hugenroth | 43/24 |
| 2,292,519 | 8/1942 | Hiner | 43/24 |
| 4,051,618 | 10/1977 | Ohmura | 43/24 |
| 4,080,748 | 3/1978 | Ohmura | 43/24 |
| 4,218,841 | 8/1980 | Gallagher | 43/24 |
| 4,334,379 | 6/1982 | Nelli | 43/24 |
| 4,445,293 | 5/1984 | Ohmura | 43/24 |

FOREIGN PATENT DOCUMENTS

| | | | |
|---|---|---|---|
| 0409800 | 1/1991 | European Pat. Off. | 43/24 |
| 3012838 | 11/1980 | Fed. Rep. of Germany | 43/24 |
| 1377264 | 9/1964 | France | 43/24 |
| 1450526 | 7/1966 | France | 43/24 |
| 2263686 | 10/1975 | France | 43/24 |
| 2646991 | 11/1990 | France | 43/24 |
| 1218143 | 1/1971 | United Kingdom | 43/24 |
| 1383521 | 2/1975 | United Kingdom | 43/24 |
| 1514368 | 6/1978 | United Kingdom | |
| 2085271 | 4/1982 | United Kingdom | |

*Primary Examiner*—Kurt C. Rowan
*Attorney, Agent, or Firm*—Dickstein, Shapiro & Morin

[57] ABSTRACT

A fixed guide mounting structure for connecting a fixed guide to a fishing rod includes a mounting seat formed on a predetermined position of the rod. The mounting seat has a larger diameter than fore and aft portions axially of the rod. The mounting seat defines an engaging groove engageable with proximal portions of the fixed guide for limiting circumferential movement of the fixed guide.

8 Claims, 3 Drawing Sheets

FIXED GUIDE MOUNTING STRUCTURE

BACKGROUND OF THE INVENTION

1. FIELD OF THE INVENTION

This invention relates to a fixed guide mounting structure attached to a intermediate position of a fishing rod such as a lure rod.

2. DESCRIPTION OF THE RELATED ART

Conventionally, a fixed guide is attached to a predetermined position of a rod, and this predetermined position has approximately the same diameter as other positions of the rod fore and aft of the predetermined position.

The portion of the rod to which the fixed guide is attached has approximately the same shape as adjacent portions of the rod and includes no special device for attaching the guide. The fixed guide is fixed at legs thereof to the rod by winding strings, with the legs aligned longitudinally of the rod. Thus, the positions of the rod with which the legs contact have increased rigidity in circumferential directions of the rod, compared with other positions.

Since flexural rigidity is not uniform circumferentially of the rod, the rod may be twisted circumferentially or the tip top of the rod may undergo sudden changes of direction while the angler attempts to control a fish. The rod could be damaged in this way.

SUMMARY OF THE INVENTION

The object of the present invention is to provide a fixed guide mounting structure with a simple modification to allow a fishing rod to exhibit substantially uniform repulsion when bending stress (load) occurs in any circumferential directions.

The above object is fulfilled, according to the present invention, by a fixed guide mounting structure comprising a fixed guide mounting seat formed on a predetermined position of a rod, the fixed guide mounting seat having a larger diameter than fore and aft portions axially of the rod with respect to the predetermined position.

The fixed guide mounting seat having a large diameter suppresses localized increases in modulus of section due to the legs of the fixed guide. Thus, the rod has increased strength owing to relaxation of local stress concentration.

Consequently, there is now less possibility of circumferential twisting of the rod under great loads occurring in the course of controlling a fish. The rod may also be protected from damage due to sudden changes of direction of the tip top of the rod.

The fixed guide mounting seat may include an engaging portion for limiting circumferential movement of the fixed guide.

The engaging recess will perform a holding function to check circumferential movement of the fixed guide under a moving force applied by the fishing line.

This construction effectively prevents the fishing line from twining around the fixed guide as a result of circumferential movement of the fixed guide on the rod, thereby to protect the rod. Furthermore, the guide is easily attachable to the rod since the guide may be set in position simply through engagement with the engaging portion.

Other features and advantages of the invention will be apparent from the following description.

BRIEF DESCRIPTION OF THE DRAWINGS

The drawings show fixed guide mounting structures according to the present invention, in which.

DETAILED DESCRIPTION OF THE PREFERRED EMBODIMENTS

A fixed guide mounting structure according to the present invention will particularly be described with reference to the drawings.

Figure 1:
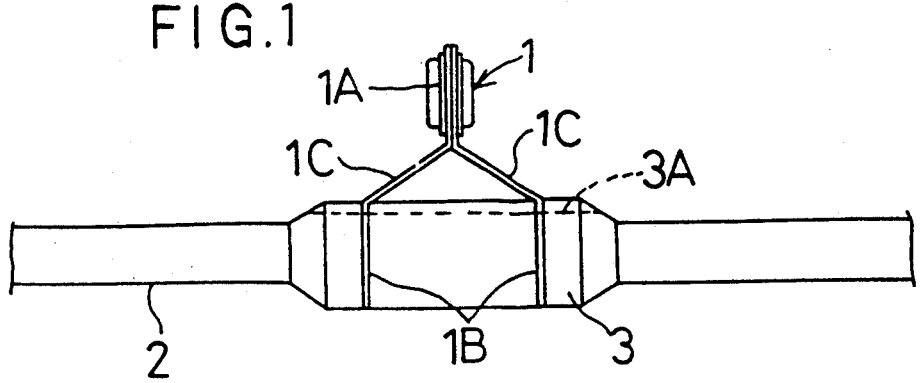
FIG. 1 is a side view of a fixed guide mounted on a fishing rod.
Figure 2:
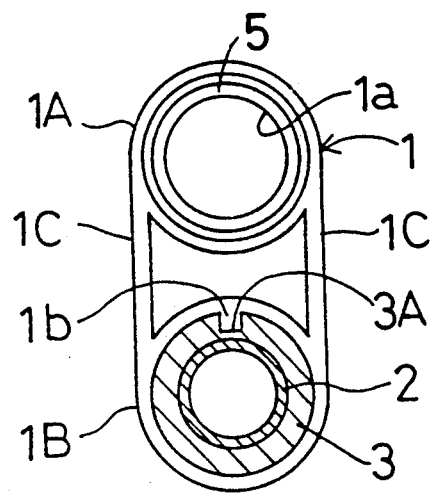
FIG. 2 is a front view in vertical section of the fixed guide and fishing rod shown in FIG. 1.
Figure 3:
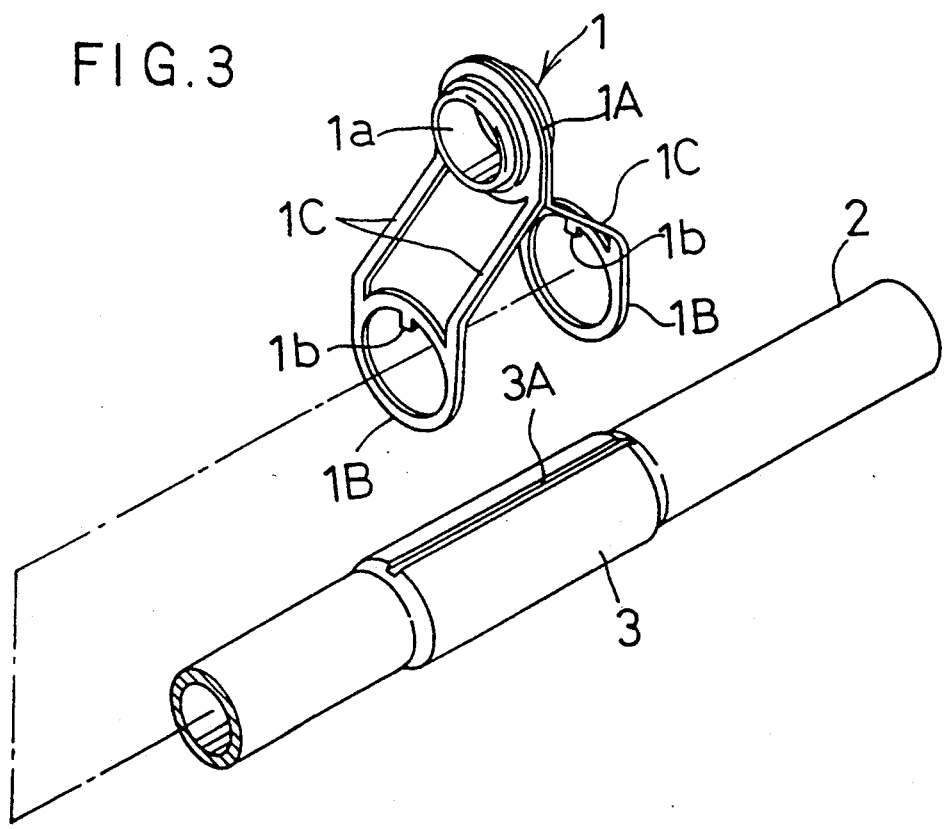
FIG. 3 is an exploded perspective view of the fixed guide and a fixed guide mounting seat.

As shown in FIG. 1, a fixed guide 1 is attached to a fishing rod 2 which preferably is a multi-layer structure formed by rolling a prepreg of a resin and a reinforced fiber with filaments paralleled to extend axially of the rod. The reinforced fiber may be one of various types of high strength fiber such as carbon fiber or glass fiber, and the invention is not limited to any particular type of fiber. By paralleling the filaments in the reinforced fiber axially of the rod, there is a less chance of cutting the filaments when machining an engaging groove 3A to be described later. As shown in FIG. 3, the rod 2 carries a tubular plastic mounting seat 3 fixed by an adhesive to a predetermined position thereof where the fixed guide 1 is attached. Thus, the fixed guide 1 is attached to the mounting seat 3 having a larger diameter than fore and aft portions of the rod 2. The mounting seat 3 defines the engaging groove 3A formed on an outer wall thereof and extending axially of the rod 2.

As shown in FIG. 1, the fixed guide 1 has a distal portion 1A defining a fishing line receiving bore 1a, legs 1C extending fore and aft from the distal portion 1A, and proximal portions 1B formed at lower ends of the legs 1C and fitted on the mounting seat 3. The distal portion 1A, proximal portions 1B and legs 1C are formed integral with one another. A ceramic guide ring 5 is fixedly fitted in the line receiving bore 1a. The proximal portions 1B include projections 1b formed on peripheral walls of bores therein for engaging the engaging groove 3A formed on the mounting seat 3.

In the construction described above, the proximal bores of the fixed guide 1 are fitted on the mounting seat 3, with the projections 1b engaged in the engaging groove 3A. In this state, the proximal portions 1B are rigidly connected to the mounting seat 3 by a resin. Exposed portions of the engaging groove 3A are filled with the resin.

According to this construction, the fitting engagement between the engaging groove 3A and projections 1b limit circumferential movement of the fixed guide 1 connected to the mounting seat 3.

Figure 4:
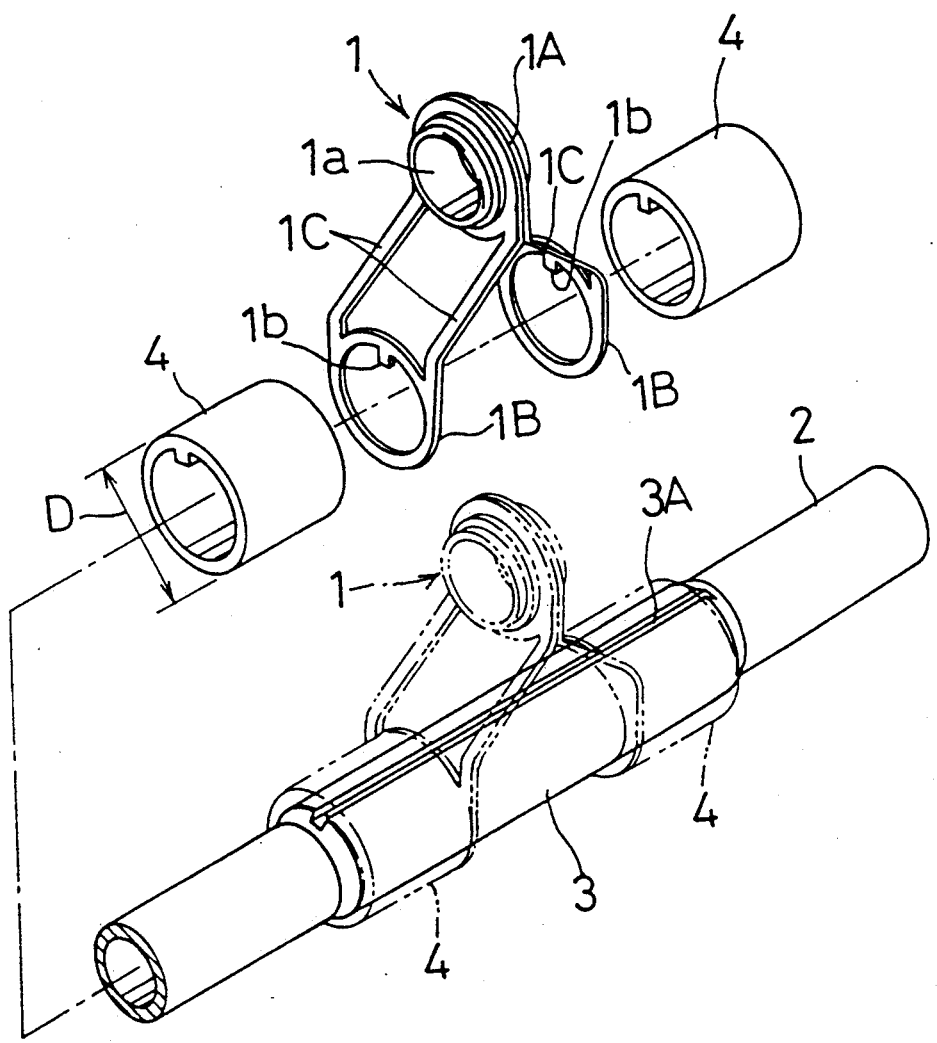
FIGS. 4 through 6 are exploded perspective views of fixed guides and fixed guide mounting seats in different embodiments.

The foregoing embodiment may be modified as follows:

(a) FIG. 4 shows an example with employs a fixed guide 1 similar to what is shown in FIG. 3, but a different fixed guide mounting structure. The illustrated mounting seat 3 is integral with the fishing rod 2 and is formed by building up a predetermined position of the rod 2. Reinforcing sleeves 4 are mounted on fore and aft positions of the rod 2 relative to the fixed guide 1 to increase fixing forces applied axially of the rod 2 to the fixed guide 1 mounted on and fixed to the rod 2. The reinforcing sleeves 4 also include projections for engaging the engaging groove 3A to increase fixing forces applied circumferentially. The reinforcing sleeves 4 have an outside diameter approximately corresponding to that of the proximal portions of the fixed guide 1. Steps between the reinforcing sleeves 4 and outer surfaces of the mounting seat 3 are filled with a resin to form a uniform outside diameter.

Figure 5:
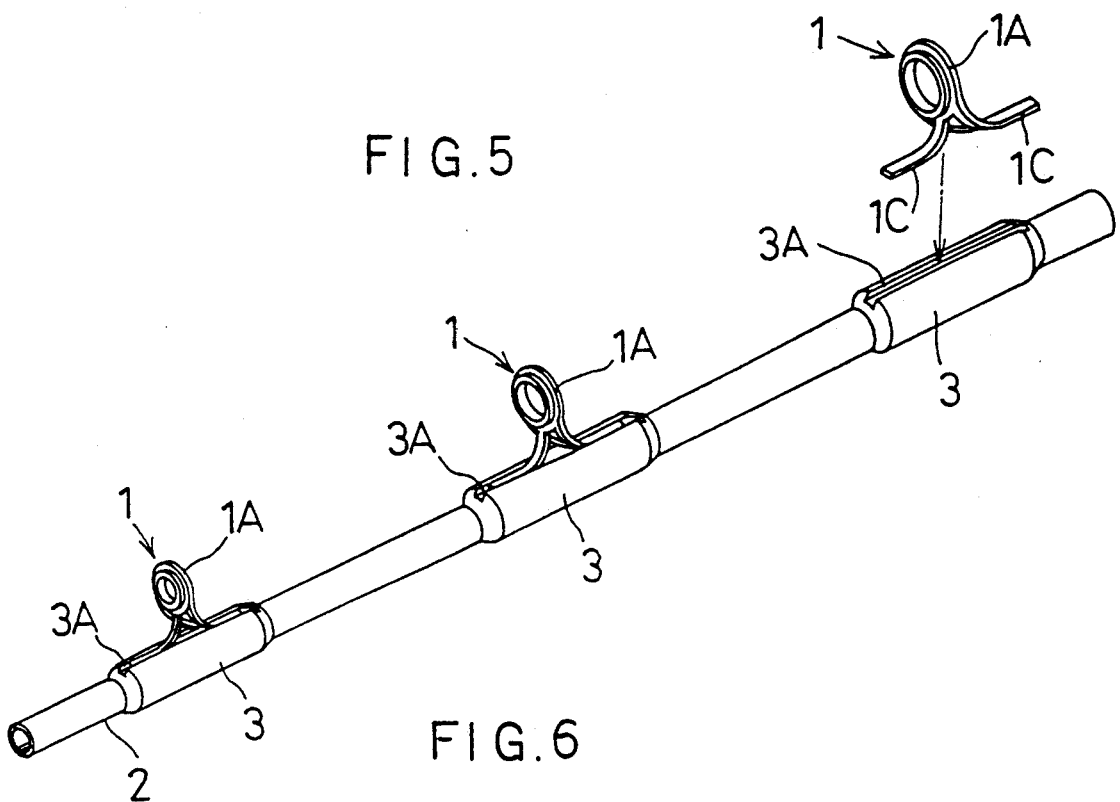

(b) FIG. 5 shows another example in which a fixed guide 1 has legs 1C extending from a distal portion 1A and curved to open in fore and aft directions away from each other. Lower ends of the legs 1C are fitted in an engaging groove 3A formed on a fixed guide mounting seat 3, and rigidly connected to the mounting seat 3 by a resin. The fixed guide 1 may be secured in place by reinforcing sleeves or by using nylon yarn instead of using the resin.

(c) As described, the fixed guide mounting seat 3 may be a separately formed seat mounted on the rod, or may be an integral large-diameter portion of the rod formed by building up. In addition, the mounting seat 3 may be formed by injection molding of a resin using a die.

(d) The fixed guide mounting set 3 and fixed guide 1 may be splined to each other. The mounting seat 3 may be formed by wrapping formed tape to present an undulating surface. In this case, the engaging groove 3A is unnecessary and projections may be formed in the proximal bores of the fixed guide 1 for engaging the undulating surface.

Figure 6:
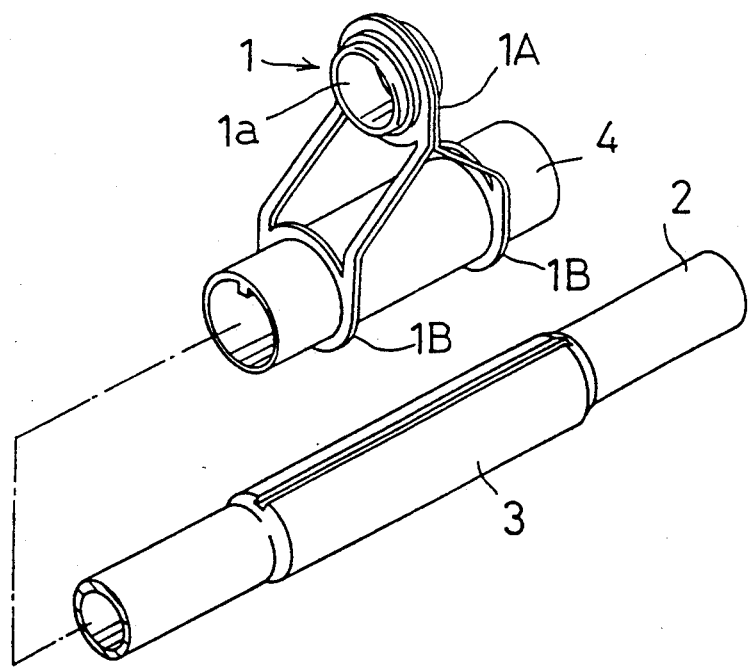

(e) FIG. 6 shows a further example in which a fixed guide 1 has proximal portions 1B including a reinforcing pipe 4 formed integral with both legs. The reinforcing pipe 4 is fitted on a fixed guide mounting seat 3 formed by buildup to have a large diameter, and fixed to a rod 2 by a resin.

(f) A step or steps may be formed on inside walls of the engaging groove 3A to set the fixed guide 1 in place against movement along the groove 3A.

What is claimed is:

1. A fishing rod provided with a fixed line guide (1) comprising:
   a rod body comprised of a first portion (2) and a second portion (3), said first portion having a substantially circular cross-section with a first diameter, said second portion having a substantially circular cross-section with a second diameter, said second portion being coaxial with respect to said first portion, and said diameter of said second portion being greater than said diameter of said first portion, and wherein said second portion has a longitudinally extending engaging recess (3A) formed therein; and
   wherein said fixed line guide (1) is overlaid on said second portion of said rod body; and
   wherein said fixed line guide includes a guide engaging projection (1b), and wherein said guide engaging projection is engaged within said engaging recess to prevent said fixed line guide from moving with respect to said rod body.

2. A fishing rod provided with a fixed line guide as claimed in claim 1, further comprising a pair of reinforcing sleeves overlaid on said second portion of said rod body on opposite axial sides of said fixed line guide, said reinforcing sleeves having sleeve engaging projections which are engaged within said engaging recess.

3. A fishing rod provided with a fixed line guide as claimed in claim 2, wherein said fixed line guide has a base portion, and wherein the outer diameters of said reinforcing sleeves are substantially identical to the outer diameter of said base portion of said fixed line guide.

4. A fishing rod provided with a fixed line guide as claimed in claim 2, wherein a radial gap exists between said reinforcing sleeves and said second portion of said rod body, and wherein a synthetic resin fills said gap, with the diameter of said resin being substantially identical to the diameters of said reinforcing sleeves.

5. A fishing rod provided with a fixed line guide as claimed in claim 1, further comprising a single reinforcing sleeve, said single sleeve being longer than said fixed line guide in the axial direction of said rod body, and wherein said fixed line guide is integrally formed on said single reinforcing sleeve.

6. A fishing rod provided with a fixed line guide as claimed in claim 1, wherein said fixed line guide has a pair of fixing feet extending in opposite directions axially of said rod body, said fixing feet being located in said longitudinally extending engaging recess (3A) of said second portion of said rod body.

7. A fishing rod provided with a fixed line guide as claimed in claim 1, wherein said second portion of said rod body is fixed to said first portion of said rod body by an adhesive.

8. A fishing rod provided with a fixed line guide as claimed in claim 1, wherein said second portion of said rod body is integral with said first portion of said rod body, with said second portion being formed by building up a predetermined position of said fishing rod.

* * * * *